US010628853B2

(12) United States Patent
Ennals et al.

(10) Patent No.: US 10,628,853 B2
(45) Date of Patent: Apr. 21, 2020

(54) LOCATION-BASED FILTERING AND ADVERTISING ENHANCEMENTS FOR MERGED BROWSING OF NETWORK CONTENTS

(71) Applicant: Intel Corporation, Santa Clara, CA (US)

(72) Inventors: Robert Ennals, Berkeley, CA (US); Prashant Gandhi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 14/919,423

(22) Filed: Oct. 21, 2015

(65) Prior Publication Data

US 2016/0110768 A1    Apr. 21, 2016

Related U.S. Application Data

(63) Continuation of application No. 12/978,125, filed on Dec. 23, 2010, now Pat. No. 10,229,433, which is a
(Continued)

(51) Int. Cl.
*G06Q 30/00*  (2012.01)
*G06Q 30/02*  (2012.01)
*G06F 16/29*  (2019.01)
*G06F 16/958*  (2019.01)
*G06F 16/2457*  (2019.01)
(Continued)

(52) U.S. Cl.
CPC ... *G06Q 30/0261* (2013.01); *G06F 16/24575* (2019.01); *G06F 16/29* (2019.01); *G06F 16/9535* (2019.01); *G06F 16/972* (2019.01); *G06Q 30/02* (2013.01); *G06Q 30/0225* (2013.01); *H04L 67/20* (2013.01); *H04L 67/22* (2013.01)

(58) Field of Classification Search
None
See application file for complete search history.

(56) References Cited

U.S. PATENT DOCUMENTS

6,732,372 B2 *  5/2004  Tomita ............... H04N 5/44543
                                                                    348/563
7,305,350 B1 *  12/2007  Bruecken ............... G06Q 10/08
                                                                    340/988
(Continued)

*Primary Examiner* — Matthew T Sittner
(74) *Attorney, Agent, or Firm* — Barnes & Thornburg LLP (57) ABSTRACT

Location-based filtering and advertising enhancements for merged browsing of network content are described herein. In various embodiments, a client device may obtain its geographic location and provide that location to a server for filtering by the server of network content fragment suggestions based at least in part on the location. The client device may then receive some or all of the filtered suggestions for utilization in merged browsing. In some embodiments, a server may further receive an indicator of content being browsed. In response, the server may determine network content fragment suggestions, and may also determine an additional suggestion or prioritize a suggestion based an advertiser's interest. The server may then provide the suggestions and/or prioritization to the client device. In various embodiments, the server may also provide the advertisement(s) for display in a user interface of the client device along with the (prioritized) suggestions.

15 Claims, 6 Drawing Sheets

Related U.S. Application Data continuation of application No. 11/855,090, filed on Sep. 13, 2007, now abandoned.

(51) Int. Cl.
*G06F 16/9535* (2019.01)
*H04L 29/08* (2006.01)

(56) References Cited

U.S. PATENT DOCUMENTS

| | | | |
|---|---|---|---|
| 7,366,696 B1* | 4/2008 | Ganesan | G06Q 20/10 705/35 |
| 7,533,084 B2* | 5/2009 | Holloway | G06F 16/958 |
| 7,555,195 B2* | 6/2009 | Yamashita | G06Q 20/1235 386/248 |
| 7,577,244 B2* | 8/2009 | Taschereau | G06Q 30/0241 379/218.01 |
| 2002/0007313 A1* | 1/2002 | Mai | G06O 30/02 705/14.13 |
| 2002/0026508 A1* | 2/2002 | Crain | G06Q 10/109 709/224 |
| 2002/0046084 A1* | 4/2002 | Steele | G06Q 30/02 705/14.64 |
| 2002/0057299 A1* | 5/2002 | Oren | G06F 16/957 715/825 |
| 2002/0078144 A1* | 6/2002 | Lamkin | G06F 21/10 709/203 |
| 2002/0147638 A1* | 10/2002 | Banerjee | G06Q 30/02 705/14.53 |
| 2003/0083937 A1* | 5/2003 | Hasegawa | G06Q 30/0253 705/14.53 |
| 2003/0158776 A1* | 8/2003 | Landesmann | G06Q 30/02 705/14.25 |
| 2003/0195021 A1* | 10/2003 | Yamashita | G06Q 20/1235 463/1 |
| 2004/0076279 A1* | 4/2004 | Taschereau | G06Q 30/0241 379/218.01 |
| 2004/0148222 A1* | 7/2004 | Sabella | G06Q 30/02 705/14.41 |
| 2005/0004897 A1* | 1/2005 | Lipson | G06K 9/6206 |
| 2005/0114366 A1* | 5/2005 | Mathai | G06Q 30/02 |
| 2005/0187823 A1* | 8/2005 | Howes | G06Q 30/02 705/14.58 |
| 2005/0197924 A1* | 9/2005 | Janakiraman | G06Q 30/02 709/227 |
| 2006/0020962 A1* | 1/2006 | Stark | G11B 27/034 725/32 |
| 2006/0064346 A1* | 3/2006 | Steenstra | G06Q 30/0261 705/14.64 |
| 2006/0116926 A1* | 6/2006 | Chen | G06Q 30/02 705/14.23 |
| 2006/0212353 A1* | 9/2006 | Roslov | G06Q 30/02 705/14.54 |
| 2006/0224587 A1* | 10/2006 | Zamir | G06F 16/9535 |
| 2006/0224624 A1* | 10/2006 | Korn | G06F 16/9535 |
| 2006/0229930 A9* | 10/2006 | Gottfurcht | G06F 3/04892 705/14.71 |
| 2006/0242267 A1* | 10/2006 | Grossman | G06Q 30/02 709/218 |
| 2006/0277098 A1* | 12/2006 | Chung | G06Q 30/02 705/14.22 |
| 2006/0293065 A1* | 12/2006 | Chew | G06Q 30/02 455/456.3 |
| 2007/0100688 A1* | 5/2007 | Book | G06Q 30/02 705/14.52 |
| 2007/0101365 A1* | 5/2007 | Clark | G06Q 30/02 725/38 |
| 2007/0112735 A1* | 5/2007 | Holloway | G06F 16/958 |
| 2007/0179985 A1* | 8/2007 | Knowles | G06F 16/9574 |
| 2007/0192352 A1* | 8/2007 | Levy | G06F 21/10 |
| 2008/0015932 A1* | 1/2008 | Haeuser | G06Q 30/0277 705/14.73 |
| 2008/0021878 A1* | 1/2008 | Jeong | G06F 16/951 |
| 2008/0077492 A1* | 3/2008 | Ho | G06F 17/212 705/14.69 |
| 2008/0086356 A1* | 4/2008 | Glassman | G06Q 30/02 705/14.41 |
| 2008/0114639 A1* | 5/2008 | Meek | G06Q 30/02 705/14.41 |
| 2008/0133336 A1* | 6/2008 | Altman | G06Q 30/0207 455/456.1 |
| 2008/0195457 A1* | 8/2008 | Sherman | G06Q 30/02 455/414.3 |
| 2008/0196095 A1* | 8/2008 | Sheynblat | G06Q 30/0217 726/9 |
| 2008/0235278 A1* | 9/2008 | Piepenbrink | G06Q 30/02 705/14.69 |
| 2008/0235623 A1* | 9/2008 | Li | G06F 16/9535 715/817 |
| 2008/0255943 A1* | 10/2008 | Morten | G06Q 30/02 705/14.53 |
| 2008/0287107 A1* | 11/2008 | Carinio | H04M 3/4878 455/414.1 |
| 2008/0288354 A1* | 11/2008 | Flinn | G06Q 30/0255 705/14.53 |
| 2009/0007274 A1* | 1/2009 | Martinez | G06F 21/10 726/27 |
| 2009/0068991 A1* | 3/2009 | Aaltonen | G06Q 30/02 455/412.1 |
| 2009/0076897 A1* | 3/2009 | Ennals | G06Q 30/02 705/14.26 |
| 2009/0157509 A1* | 6/2009 | Little | G06Q 30/0253 705/14.51 |
| 2009/0299857 A1* | 12/2009 | Brubaker | G06Q 30/02 705/14.66 |
| 2011/0093342 A1* | 4/2011 | Ennals | G06Q 30/02 705/14.58 |
| 2011/0106625 A1* | 5/2011 | Ennals | G06Q 30/02 705/14.58 |
| 2013/0042188 A1* | 2/2013 | Dobronsky | G06F 3/04817 715/760 |
| 2016/0110768 A1* | 4/2016 | Ennals | G06Q 30/02 705/14.58 |

* cited by examiner

LOCATION-BASED FILTERING AND ADVERTISING ENHANCEMENTS FOR MERGED BROWSING OF NETWORK CONTENTS

CROSS-REFERENCE TO RELATED APPLICATIONS

This application is a continuation application of U.S. application Ser. No. 12/978,125, entitled "Location-Based Filtering and Advertising Enhancements for Merged Browsing of Network Contents," which was filed on Dec. 23, 2010 and which is a continuation of U.S. patent application Ser. No. 11/844,090, entitled "Location-Based Filtering and Advertising Enhancements for Merged Browsing of Network Contents," which was filed on Sep. 13, 2007.

TECHNICAL FIELD

Embodiments relate to the fields of data processing, web applications and/or services, in particular, to location-based filtering and advertising enhancements for merged browsing of network contents.

BACKGROUND

Building on innumerable contents, applications, and services, new technologies collectively referred to as "Web 2.0" have been developed. Among these new technologies are "MashUps." A "MashUp" is a web page showing combined contents of other websites. For example, a MashUp might include a news story feed from a first website, a form from a second website, and a picture from a third website. The MashUp may be served to user browsers from a web server, just as any other web content. To-date, MashUp editors have been required to create MashUps, the MashUp editors operating in an analogous fashion to web page editors. Such MashUp editors facilitate a user in specifying a MashUp and upload the MashUp to a web server for browsing by other users.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF THE DRAWINGS

Illustrative embodiments of the present invention include, but are not limited to, methods and apparatuses for location-based filtering and advertising enhancements for merged browsing of network content. In various embodiments, a client device may obtain its geographic location and provide that location to a server for filtering by the server of network content fragment suggestions based at least in part on the location. The client device may then receive some or all of the filtered suggestions for utilization in merged browsing. In some embodiments, a server may further receive an indicator of content being browsed. In response, the server may determine network content fragment suggestions, and may also determine an additional suggestion or prioritize a suggestion based on an advertiser's interest. The server may then provide the suggestions and/or prioritization to the client device. In various embodiments, the server may also provide the advertisement(s) for display in a user interface of the client device along with the (prioritized) suggestions.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "merged browse" and "merged browsing" refer to techniques for combining or appearing to combine network contents, giving the contents the appearance of being visually merged, while the user is browsing one of the network contents.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
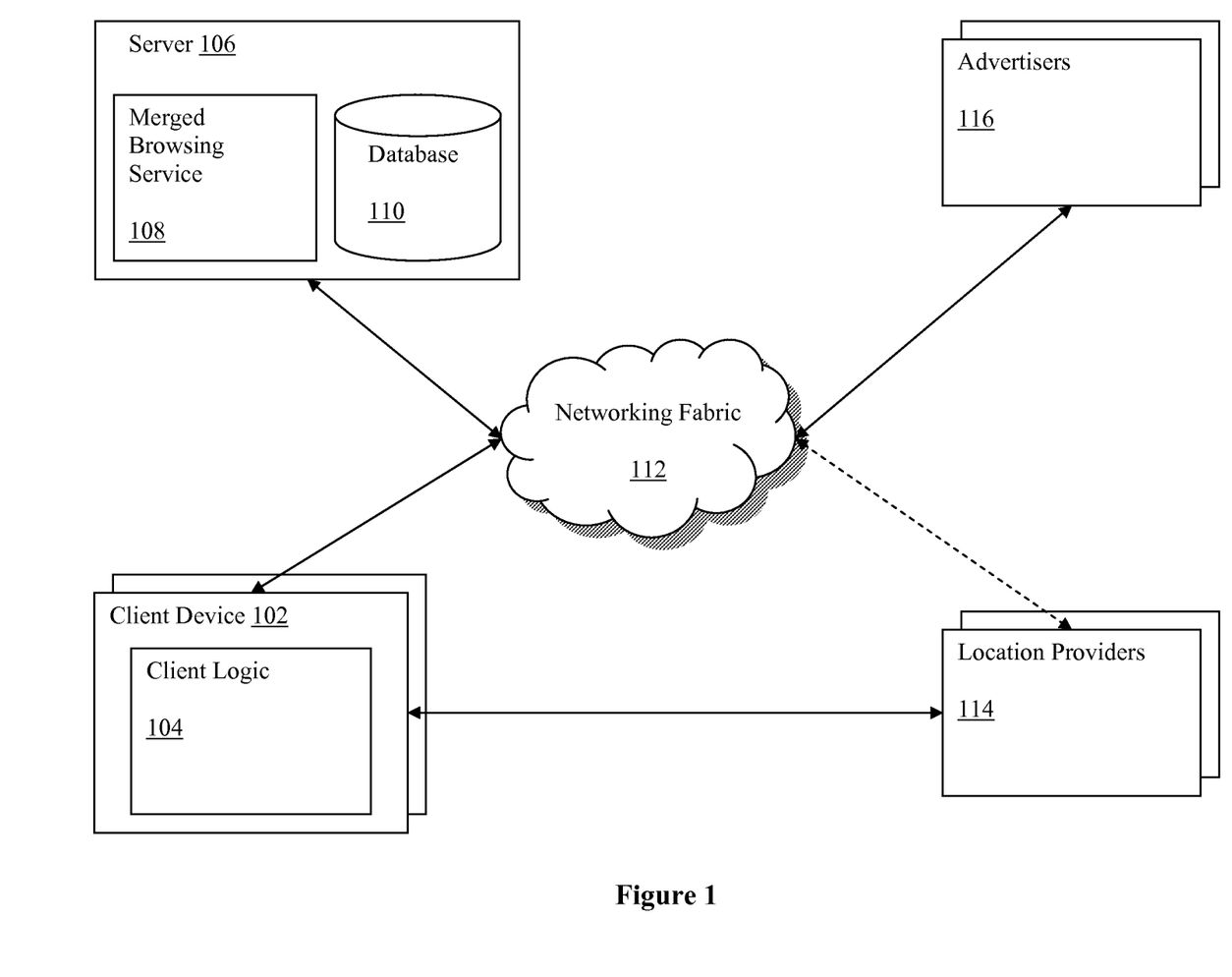
FIG. 1 illustrates an overview of various embodiments of the present invention.

FIG. 1 illustrates an overview of various embodiments of the present invention. As illustrated, a client device 102 may include client logic 104 to receive or derive a geographic location of the client device 102. The client logic 104 may receive geographic location(s) from one or more location providers 114, either directly or via networking fabric 112, which may couple client device 102 and location providers 114. Client logic 114 may provide the received or derived location, optionally, along with an indication of network content being browsed by a user of client device 102, to server 106 via networking fabric 112, which may couple client device 102 and server 106. Server 106 may have a merged browsing service 108 and a database 110, the merged browsing service 108 being capable of determining, with reference to database 110, one or more network content fragment suggestions to provide to the client device 102 to facilitate a user of client device 102 in merged browsing one or more suggested fragment(s) with the network content being browsed. Merged browsing service 108 may determine the fragment suggestions based at least in part on the indicator and/or the geographic location. In embodiments where the fragment suggestion(s) are determined based on the indicator, merged browsing service 108 may filter the determined fragment suggestion(s) based on the geographic location. Merged browsing service 108 may then provide the filtered fragment suggestion(s) to client device 102 to enable client device 102 to facilitate merged browsing.

As is further illustrated, server 106 may enable advertisers 116, which may be coupled to server 106 via networking fabric 112, to specify or select network content fragment suggestion(s) which the advertisers 116 may wish to add to the above-mentioned determined fragment suggestion(s) or to prioritize when among the above-mentioned determined fragment suggestion(s). Also, server 106 may additionally or alternatively facilitate advertisers 116 in selecting indicators and/or geographic locations. Server 106 may then associate the selected indictors and/or geographic locations with advertisements of the advertisers 116 and may, in response to receiving the indicators and/or geographic locations, provide the advertisement with the determined fragment suggestion(s).

Figure 6:
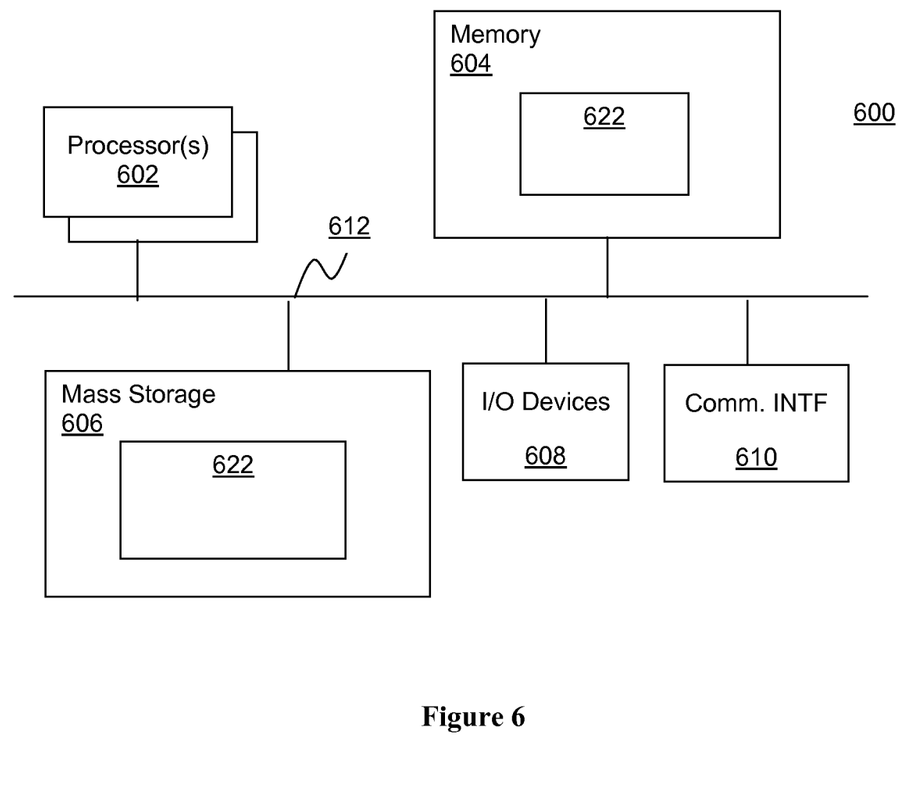
FIG. 6 illustrates an example computer system suitable for use to practice client device and/or server aspects of various embodiments of the present invention.

As illustrated, client devices 102 and server 106 may each be any single- or multi-processor central processing unit (CPU) computing system. Client devices 102 and server 106 may each be a personal computer (PC), a workstation, a server, a router, a mainframe, a modular computer within a blade server or high-density server, a personal digital assistant (PDA), an entertainment center, a set-top box, or a mobile device. An exemplary single-/multi-processor or processor core computing system of each of client devices 102 and server 106 is illustrated by FIG. 6, and is described in greater detail below.

In various embodiments, as mentioned above, client devices 102 may each include client logic 104 to provide indicators and geographic locations to server 106 to enable server 106 to provide network content fragment suggestions to client devices 102. Client logic 104 may comprise any sort of single- or multi-thread application and may be implemented as a plug-in to a client device 102 browser, such as a plug-in to a Mozilla Firefox browser, or as a separate program invocable by a user, while browsing, to enhance the user's browsing experience. Also, client logic 104 may include one or more user interface components, such as the visual component 504 illustrated in FIG. 5 and described below in greater detail. The user interface components of client logic 104 may provide visual representations of network content fragment suggestions and of advertisements to the user. In one embodiment, such suggestion representations may be selectable inputs, such as buttons, that a user can, for example, click on with a mouse to select one or more of the fragment suggestions for merged browsing. In some embodiments, the advertisements may include pop-up windows, banner advertisements, video clips, audio-visual clips, pictures, and/or text displays located within visual component 504, within another region of browser display 500, or within a separate display window. In some embodiments, client logic 104 is loaded and operates when the client device 102 browser is loaded and operates. In other embodiments, client logic 104 is loaded and begins operating when the user invokes logic 104 to enhance the user's browsing.

In various embodiments, once client logic 104 begins executing (or at a later time), client logic 104 may receive geographic locations from one or more location providers 114. Such location providers 114 may include GPS-based location providers, Internet Protocol (IP) address-based location providers, and Wi-Fi access point-based location providers. These types of location providers are well known in the art, and accordingly will not be described further. Also, in some embodiments, location providers 114 may be an integral part of or locally coupled to client devices 102. For example, location providers 114 may be coupled to a client device 102 though a local wired or wireless network. In other embodiments, location providers 114 may be remotely coupled to client devices 102 via networking fabric 112, as described below.

In some embodiments, if more than one geographic location is received by client logic 104, client logic 104 may derive a composite geographic location. Such a derived geographic location may be a "best fit" location (with what is considered "best" varying from embodiment to embodiment) derived in view of the accuracy of the various location providers 114, and may be calculated using any algorithm known in the art.

Upon receiving or deriving the geographic location, client logic 104 may provide the location to server 106 to enable server 106 to filter network content fragment suggestions to be provided by server 106 to client device 102 to facilitate merged browsing of the suggested, filtered network content fragments with network content being browsed by a user of client device 102.

In some embodiments, once client logic 104 begins executing, client logic 104 also determines whether the user is browsing network content and, if the client is browsing network content, client logic 104 determines an indicator of the network content being browsed to provide to server 106. In some embodiments, the indicator may comprise a network locator (e.g., uniform resource locator (URL)), such as the locator of the exact content being browsed (e.g., www-.name.com/page1.html) or a reduced form of the locator (e.g., a host name). In other embodiments, the indicator may comprise one or more other descriptors of the browsed network content, such as a page title found in metadata of the browsed network content, headers found in the browsed network content, and/or one or more other descriptors of the content. Upon determining the indicator, the client logic 104 may provide the indicator to server 106 to indicate to server 106 the network content being browsed by the client device 102 user. In some embodiments, each time the user browses to new network content, such as a new web page, client logic 104 determines a new indicator and provides the new indicator to server 106. In other embodiments, client logic 104 only provides a new locator when the user browses to network content associated with a different host name. In one embodiment, client logic 104 provides the above mentioned received/derived geographic location simultaneously with the indicator.

In various embodiments, after providing server 106 with the above-described indicator and geographic location, client logic 104 may receive a list of one or more network content fragment suggestions, having been filtered in view of the geographic location by server 106, for combining with the browsed network content. The list of suggestions received by client logic 104 may comprise a complex set of data and rules for extracting relevant data, including the network content fragments corresponding to the suggestions, by client logic 104. The process by which server 106 determines the list is described below in detail. In one embodiment, the suggested network content fragments may be one or more of text, pictures, audio files, video files, audio-visual files, form elements, or programs selected from one or more pages of network content. These fragments may be visually merged with the browsed network content for merged browsing. For example, if the browsed network content is a web page with a plurality of apartment listings, the suggested fragment may be a category of address fragments, and address fragments may be added to apartment listings for which fragments are available. Client logic 104 may then present the suggestions to the user through, for example, the above-described visual display to facilitate the user in selecting at least one of the network content fragments to be visually merged with the network content for merged browsing.

In some embodiments, one or more of the fragment suggestions displayed to the user may be a suggestion paid for by an advertiser 116. Such advertiser suggestions may have the same appearance as other suggestions, or may have a differing appearance to indicate that the suggestion has been funded by an advertiser (for example, advertiser suggestions may be manifested as buttons having one color, while other suggestions may be manifested as buttons having another color). In one embodiment, where a plurality of suggestions are displayed to a user, and some of the suggestions are displayed in a more desirable display location (with what is "more desirable" varying from embodiment to embodiment), and the suggestions displayed in the more desirable display locations may be suggestions having a higher priority. The suggestions may include data specifying their priority in a manner recognizable by client logic 104, which may then display the higher priority suggestions in the more desirable display locations. In one embodiment, an advertiser 116 may pay server 106 for such higher priority of a suggestion.

In various embodiments, as mentioned above, client logic 104 may receive and render one or more advertisements with the suggestions. The varying types of advertisements that may be received are mentioned above, and may include any sort of advertisements known in the art.

In one embodiment, a portion of the merged browsing service 108 or other logic of server 106 may be implemented on client device 102. Such a portion may be capable of filtering network content fragment suggestions in view of the received or derived geographic location (exemplary filtering is described below in greater detail), with another portion on remotely disposed server 106 capable of providing the unfiltered suggestions. In such an embodiment, client logic 104 need only transmit the indicator, not the geographic location, to server 106. Also, in such an embodiment, the portion capable of filtering may be a part of client logic 104.

In some embodiments, client logic 104 may then receive a selection by the user of at least one network content fragment that was suggested to the user. Client logic 104 may receive the selection through, for example, an activation by the user of one of the above-described visual representation(s) associated with the at least one network content fragment. In response to receiving the user's selection, client logic 104 may facilitate merged browsing of the selected fragment(s) with the browsed network content. In various embodiments, facilitating merged browsing may include the client logic 104 either combining structural descriptions/specifications associated with the selected fragment(s) and browsed network content to create merged content for merged browsing or receiving merged content from server 106 for merged browsing. The descriptions/specifications to be combined may be retrieved, in one embodiment, using the above-mentioned rules for extracting data.

In various embodiments, if the user selects a suggestion paid for by an advertiser 116 for merged browsing, client logic 104 may notify server 106 of the selection to facilitate server 106 in notifying advertiser 116. In some embodiments, client logic 104 may additionally or alternatively report to server 106 any user interactions with any displayed advertisements provided by server 106. Such interactions may include any known interactions in the art, such as clicks and eyeball movements.

As illustrated and described above, server 106 may include merged browsing service 108 and database 110 to facilitate advertiser's 116 selection or specification of network content fragment suggestions, to receive indicators and geographic locations from client devices 102, and to determine and provide network content fragment suggestions to client devices 102. Merged browsing service 108 may be any single- or multi-threaded service application and may be capable of simultaneously serving multiple client devices 102.

In various embodiments, merged browsing service 108 may facilitate an advertiser 116 in browsing and/or searching database 110 to select a network content fragment suggestion to be added to the above-mentioned list of suggestions provided to client devices 102 and/or to be prioritized within the list. For example, advertiser 116 may search for a suggestion corresponding to a fragment of the advertiser's 116 website. Merged browsing service 108 may provide such browsing/searching functionalities, in one embodiment, through a user interface to database 110 accessible by advertiser 116 via networking fabric 112. In such an embodiment, advertiser 116 may comprise at least one computer system (but may comprise an enterprise-level private network of computer systems) belonging to a real or corporate person, as well as a user of the computer system. In other embodiments, the computer system of advertiser 116 may search and make advertising decisions automatically, without user interaction. Upon receiving a selection of a fragment suggestion, merged browsing service 108 may facilitate advertiser 116 in specifying indicators and/or geographic locations and may associate the specified indicators and/or geographic locations with the selected fragment suggestion.

In some embodiments, instead of or in addition to facilitating searching/browsing, merged browsing service 108 may facilitate advertiser 116 in specifying a network content fragment suggestion. Such specifying may comprise, in one embodiment, facilitating and accepting a registration of a network content fragment suggestion from the advertiser 116. Upon accepting the registration, merged browsing service 108 may store the registration in database 110. In one embodiment, the registration may include one or more rules for extracting the data to comprise the network content fragment and/or a network locator to a network site including the fragment. Once specified and stored, merged browsing service 108 may facilitate advertiser 116 in selecting the advertiser-specified fragment suggestion for addition and/or prioritization, in the manner discussed above, may further facilitate advertiser 116 in specifying indicators and/or geographic locations, and may associate the specified indicators and/or geographic locations with the fragment suggestion.

In various embodiments, merged browsing service 108 may also facilitate advertiser 116 in selecting indicators and/or geographic locations and may associate the selected indicators and/or geographic locations with an advertisement of the advertiser, such as the sort discussed above, for providing along with the list of fragment suggestions. In one embodiment, merged browsing service 108 may also facilitate specification and storage, of the advertisement.

In some embodiments, merged browsing service 108 may further be capable of receiving indicators of network content being browsed by users of client device 102 and/or a geographic location of the client device 102, as described above. The merged browsing service 108 may then use the indicator and/or geographic location as a lookup index to database 110 to determine one or more network content fragment suggestions to provide to the client device 102. In one embodiment, only the indicator may be used as the lookup index, and the resulting suggestions may be filtered in view of the location. Merged browsing service 108 may then create a list of the determined (and possibly filtered) fragment suggestions to provide to client device 102.

In various embodiments, merged browsing service 108 may also determine if there are any additional fragment suggestions and/or prioritizations of fragment suggestions based on an advertiser 116's indication of interest in the received indicator or the geographic location. Such an indication of interest may include both the above-mentioned specification of indicators and/or locations of interest and, in one embodiment, a financial transaction, such as payment or promise of payment to be made by advertiser 116. Upon performing the additional determination, merged browsing service 108 may add fragment suggestion(s) to the list of suggestions and/or may add information to the list giving one of the suggestions a higher priority.

In some embodiments, merged browsing service 108 may further determine an advertisement to be shown in a user interface of client device 102 based on the received indicator and geographic location, if an advertiser 116 has indicated interest in providing the advertisement, as discussed above.

In various embodiments, merged browsing service 108 may then provide the list and any determined advertisements to the client device 102 to assist a user of the client device 102 in merged browsing.

In one embodiment, merged browsing service 108 may further receive an indication from the user of the client device 102 of at least one network content fragment suggestion selected by the user for merged browsing. In such an embodiment, merged browsing service 108 may further determine whether the fragment suggestion selected by the user was added or prioritized by an advertiser 116 and, if so, may notify advertiser 116 of the selection of the advertiser selected/specified fragment suggestion. In one embodiment, merged browsing service 108 may then also retrieve the specifications/structural descriptions, using, for example, rules stored in database 110, and combine the specifications or overlay the nodes. The resulting merged content may then be provided to the client device 102 by merged browsing service 108 to assist merged browsing. Further, merged browsing service 108 may additionally or instead receive a further indication from client device 102 of a user of the client device's interaction with the advertisement, and may notify the advertiser 116 of the interaction.

As is shown, server 106 may include database 110, and database 110 may be any sort of database known in the art, except for its internal structuring (e.g., tables) and data. Database 110 may be a relational database, a normalized database, a de-normalized database, or a file. In various embodiments, database 110 may store registrations for network content, network content fragments, and/or categories of either, the registrations including, but not limited to, rules, locators, and other information. Database 110 may also store combinations of fragments/fragment categories and network content/content categories that have been merged browsed.

In one embodiment, database 110 may also store location information and/or other contextual information associated with a combination. Such location information may include a location associated with the provider of the network content/content fragment or a location where a user of a client device 102 previously made a combination. Database 110 may also store advertiser selections, specifications, and advertisements, as discussed above.

As is further shown, client devices 102, server 106, location providers 114, and/or advertisers 116 may be connected by a networking fabric 112. The networking fabric 112 connecting the computing systems may be any sort of networking fabric known in the art, such as one or more of a local area network (LAN), a wide area network (WAN), and the Internet. In various embodiments, the networking fabric may comprise a private LAN or WAN of an enterprise. The parties to the connection, that is client devices 102, server 106, location providers 114, and/or advertisers 116, may further use any communication protocol known in the art, such as the Hypertext Transfer Protocol (HTTP), and any transport protocol known in the art, such as the Transmission Control Protocol/Internet Protocol (TCP/IP) suite of protocols. Each of client devices 102, server 106, location providers 114, and/or advertisers 116 may have a networking interface to facilitate networked communication across networking fabric 112.

Figure 2:
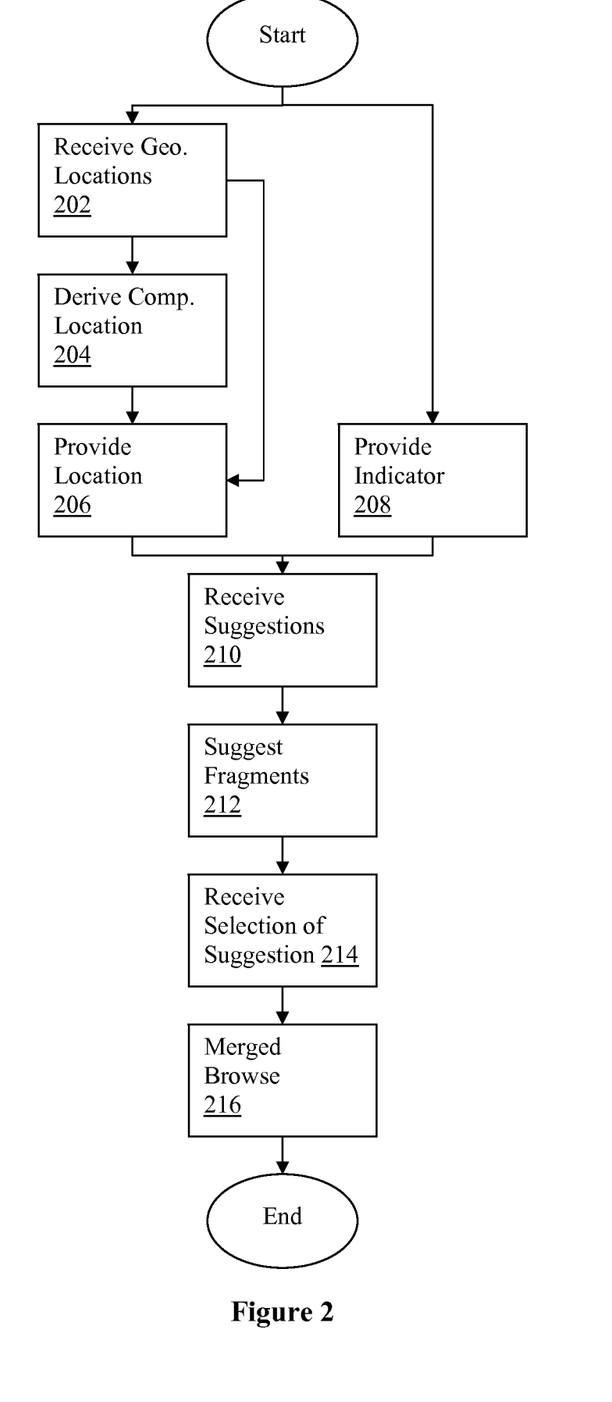
FIG. 2 illustrates a flow chart view of selected client device operations of the methods of various embodiments of the present invention.

FIG. 2 illustrates a flow chart view of selected client device operations of the methods of various embodiments of the present invention. As illustrated, the client device may receive a geographic location of the client device, block 202. The client device may receive the geographic location from one or more of a Global Positioning System-based location provider, an Internet Protocol address-based location provider, or an access point-based location provider. In one embodiment, the client device may receive a plurality of geographic locations of the client device, block 202, and may derive a composite geographic location of the client device from the plurality of received geographic locations, block 204.

In some embodiments, the client device may then provide the received or derived geographic location to a server to enable the server to filter network content fragment suggestions, block 206, the server configured to filter the network content fragment suggestions based on the provided geographic location. Additionally, the client device may provide to the server an indicator of the network content being browsed by a user of the client device, block 208.

In response, the client device may receive from the server the filtered network content fragment suggestions, block 210. In one embodiment, a portion of the server may be located on the client device, and that portion may be capable of filtering network content fragment suggestions received from another portion of the server based on the geographic location, and the other portion may be remotely disposed from the client device. In various embodiments, the client device may then suggest, to the user, the network content fragments, block 212, to facilitate the user in selecting at least one of the network content fragments to be visually merged with the network content for merged browsing. In response, the client device may then receive the user's selection to merge all or a subset of the suggested network content fragments with the network content being browsed, block 214. The client device may then facilitate merging of the selected network content fragment(s) with the network content being browsed for merged browsing of the merged content, block 216.

Figure 3:
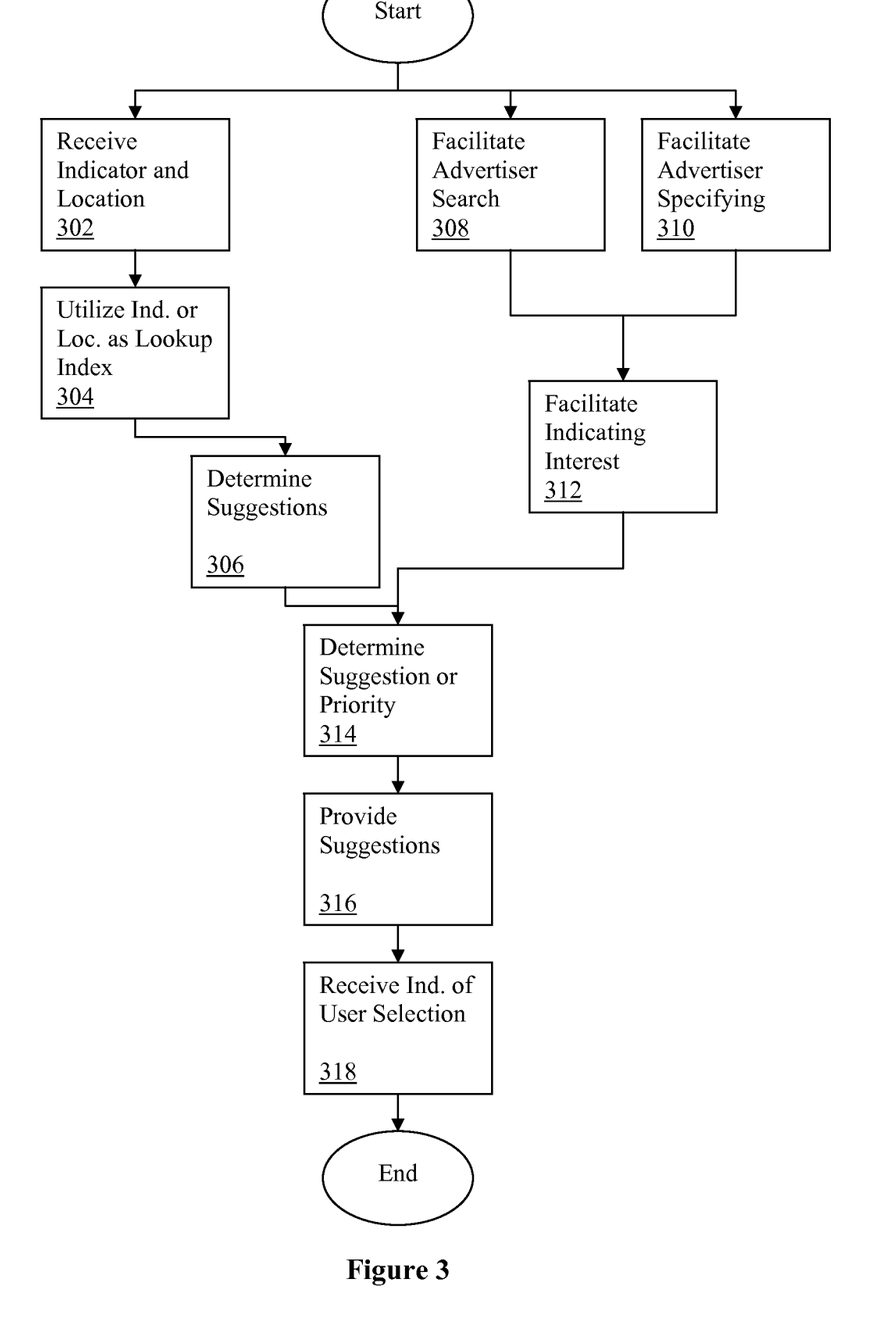
FIG. 3 illustrates a flow chart view of selected server operations of the methods of various embodiments of the present invention.

FIG. 3 illustrates a flow chart view of selected server operations of the methods of various embodiments of the present invention. As illustrated, a server may receive, from a client device, an indicator of network content being browsed by the client device and/or a geographic location of the client device, block 302. Upon receipt, the server may utilize the indicator or the geographic location as a lookup index to information stored in a database of the server, block 304. In such embodiments, the server may have a database storing information specifying (a) combinations of network content fragments and/or categories of network content fragments with network contents or categories of network contents, and (b) previous geographic locations at which some or all of the combinations have been made by a user of the client device or another user. In some embodiments, the client device may then determine at least one network content fragment suggestion to provide to the client device based on the received indicator or geographic location, block 306.

In various embodiments, the server may also facilitate an advertiser in browsing and/or searching a database of network content fragment suggestions to select an advertiser-selected network content fragment suggestion, block 308. In other embodiments, the server may facilitate an advertiser in specifying an advertiser-selected network content fragment suggestion, block 310. Following either the selecting or the specifying of the advertiser-selected network content fragment suggestion, the server may facilitate the advertiser in indicating interest in the indicator and/or the geographic location by facilitating the advertiser in selecting the indicator and/or geographic location and by associating the indicator and/or geographic location with the advertiser-selected network content fragment suggestion, block 312.

In some embodiments, the server may then determine either an additional network content fragment suggestion or a priority of the at least one network content fragment suggestion based on the advertiser's indication of interest in the indicator or the geographic location, block 314, the additional network content fragment suggestion or the prioritized at least one network content fragment suggestion being the advertiser-selected network content fragment suggestion. In one embodiment, the server may perform such determining based on the advertiser's indication of interest, and the indication of interest may include a financial transaction.

In various embodiments, the server may then provide the at least one network content fragment suggestion and, if determined, the additional network content fragment suggestion, to the client device to assist a user of the client device in merged browsing, block 316. In some embodiments, the server may then receive, in response, an indication of the client device user's selection, for merged browsing, of a network content fragment corresponding to the additional network content fragment suggestion or the prioritized at least one network content fragment suggestion, block 318, and may notify the advertiser of the client device user's selection.

Figure 4:
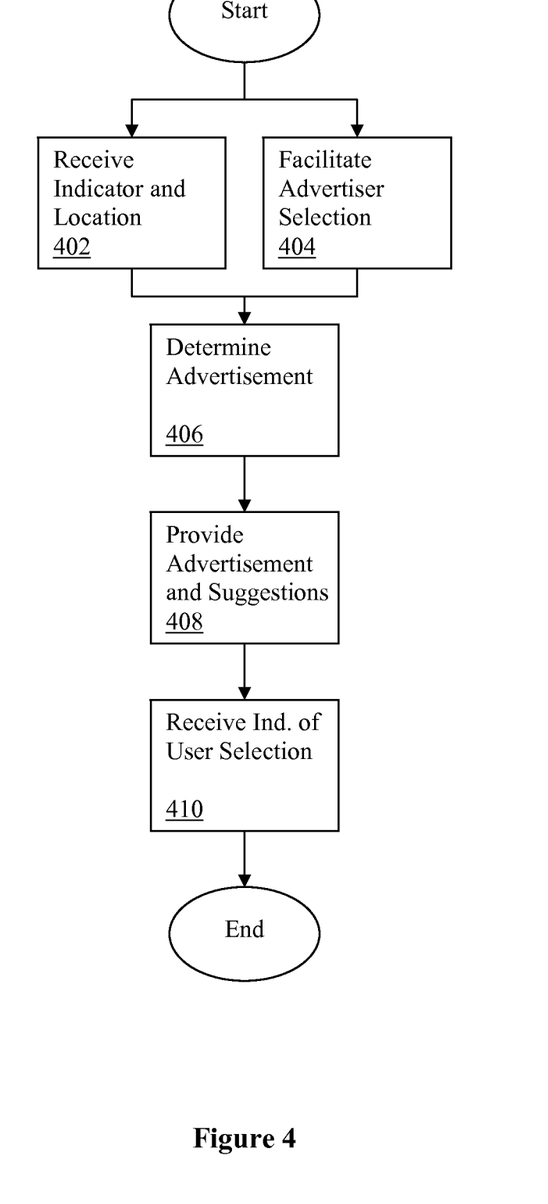
FIG. 4 illustrates a flow chart view of additional/alternative selected server operations of the methods of various embodiments of the present invention.

FIG. 4 illustrates a flow chart view of additional/alternative selected server operations of the methods of various embodiments of the present invention. As illustrated, a server may receive from a client device an indicator of network content being browsed by the client device and a geographic location of the client device, block 402. In some embodiments, the server may also facilitate an advertiser in selecting an indicator and geographic location and may associate the indicator and geographic location with an advertisement of the advertiser, block 404. In one embodiment, the advertiser-selected indicator and geographic location may be the indicator and geographic location received by the server from the client device, and the advertiser's selection may be made before or after the server's receipt of the indicator and the geographic location. In response to the receipt and selection, the server may determine the advertisement of the advertiser to be shown in a user interface of the client device, block 406. In one embodiment, the advertisement may be one of a pop-up window, a banner advertisement, a video clip, an audiovisual clip, a picture, or a text display.

In various embodiments, the server may then provide the advertisement with one or more network content fragment suggestions to the client device, block 408, the one or more network content fragment suggestions being provided to assist the client device in merged browsing at least one network content fragment with the network content. In response, the server may then receive from the client device an indication of a user of the client device's interaction with the determined advertisement, block 410, and may notify the advertiser of the client device user's interaction.

Figure 5:
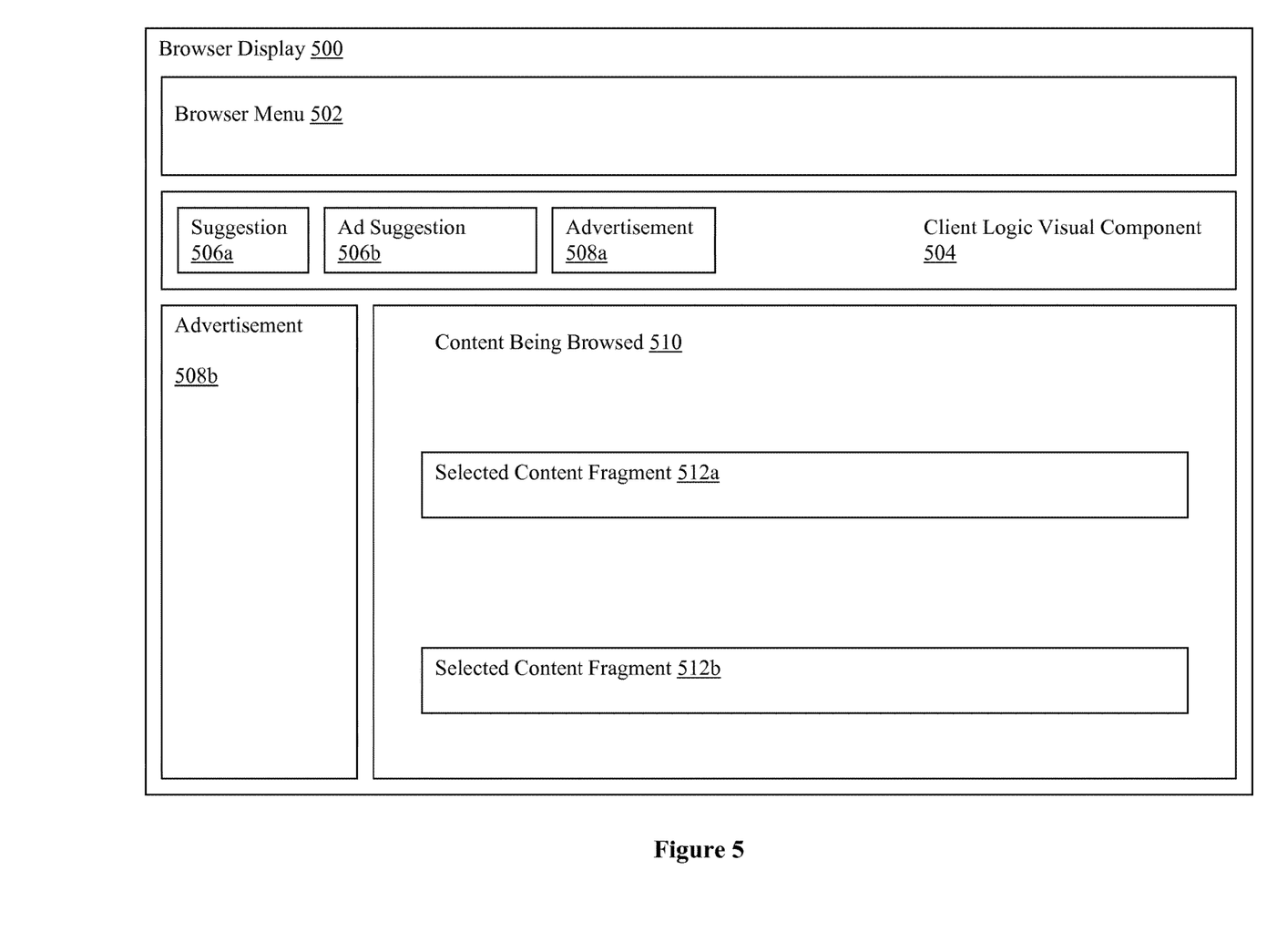
FIG. 5 illustrates an exemplary display of an enhanced client browser in accordance with various embodiments of the invention.

FIG. 5 illustrates an exemplary display of an enhanced client browser in accordance with various embodiments of the invention. As illustrated, a browser display window 500 may include a browser menu component 502 and other menu components known in the art, such as, for example, a Google® Toolbar. Browser display 500 may also be enhanced with a client logic visual component 504, appearing as a menu bar, and visual component 504 may facilitate at least a portion of the client logic 104 operations described above.

As shown, visual component 504 may also include a number of icons, such as suggestion/advertisement suggestion buttons 506a/506b. Suggestion/advertisement suggestion buttons 506a/506b may render, to a user, display representations of suggestions of network content fragments for combining with network contents being browsed by the user, as is described in greater detail above with regard to FIG. 1. As is also shown, visual component 504 may also include an advertisement 508a, such as a banner advertisement, as discussed above with regard to FIG. 1.

In a region of the browser display 500 which typically shows network content being browsed 510, the user may merged browse content 510 and one or more selected network content fragments 512a/512b, the content 510 and fragment(s) 512 appearing visually merged, as is described in greater detail above with regard to FIG. 1.

As is further shown, to a side of the region having content 510 and fragment(s) 512, the browser display 500 may include an advertisement 508b, such as a video, audiovisual, or other graphic and/or textual display, as discussed above with regard to FIG. 1. While advertisement 508b is shown in a side region of browser display 500, advertisement 508b may be located in any area of browser display 500 and, in one embodiment, may form a separate display window, such as a "pop up" advertisement 508b.

FIG. 6 illustrates an example computer system suitable for use to practice client device and/or server aspects of various embodiments of the present invention. As shown, computing system 600 includes a number of processors or processor cores 602, and system memory 604. For the purpose of this application, including the claims, the terms "processor" and "processor cores" may be considered synonymous, unless the context clearly requires otherwise. Additionally, computing system 600 includes mass storage devices 606 (such as diskette, hard drive, compact disc read only memory (CDROM) and so forth), input/output devices 608 (such as display, keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing the various components, such as client logic 104 or merged browsing service 108, herein collectively denoted as 622. The various components may be implemented by assembler instructions supported by processor(s) 602 or high-level languages, such as, for example, C, that can be compiled into such instructions.

The permanent copy of the programming instructions may be placed into permanent storage 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The constitution of these elements 602-612 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

The invention claimed is:

1. A server for facilitating browsing on a client device, the server comprising:
one or more processors; and
one or more memories having a plurality of instructions stored thereon that, when executed by the one or more processors, cause the server to:
identify a geographic location of the client device and an indicator that is representative of a network locator and is associated with a first content for display on a graphical user interface of the client device received from the client device;
receive, from a third-party advertiser, a specification of a priority of content selected by the third-party advertiser;
determine a second content and a visual component representative of the second content based on the indicator, the geographic location, and the specification of the priority, wherein the visual component is selectable on the graphical user interface by a user of the client device to display the second content on the graphical user interface, wherein the second content is associated with a second network locator different from the first network locator and is less than an entirety of network content associated with the second network locator;
provide the second content and the visual component to the client device contemporaneously; and
notify the third-party advertiser of the user selection of the visual component on the client device in response to receipt of an indication of the selection from the client device.

2. The server of claim 1, wherein the second content comprises an advertisement.

3. The server of claim 1, wherein the visual component is selectable on the graphical user interface by the user of the client device to display the second content on the graphical user interface contemporaneously with the display of the first content.

4. The server of claim 1, wherein the visual component corresponds with a region of the graphical user interface of the client device.

5. The server of claim 1, wherein to determine the second content comprises to determine an advertiser-selected content based on a selection, by an advertiser, of content to correspond with the first content.

6. One or more non-transitory machine-readable storage media comprising a plurality of instructions stored thereon that, in response to execution by a server, causes the server to:
identify a geographic location of a client device and an indicator that is representative of a network locator and is associated with a first content for display on a graphical user interface of the client device received from the client device;
receive, from a third-party advertiser, a specification of a priority of content selected by the third-party advertiser;
determine a second content and a visual component representative of the second content based on the indicator, the geographic location, and the specification of the priority, wherein the visual component is selectable on the graphical user interface by a user of the client device to display the second content on the graphical user interface, wherein the second content is associated with a second network locator different from the first network locator and is less than an entirety of network content associated with the second network locator;
provide the second content and the visual component to the client device contemporaneously; and
notify the third-party advertiser of the user selection of the visual component on the client device in response to receipt of an indication of the selection from the client device.

7. The one or more non-transitory machine-readable storage media of claim 6, wherein the second content comprises an advertisement.

8. The one or more non-transitory machine-readable storage media of claim 6, wherein the visual component is selectable on the graphical user interface by the user of the client device to display the second content on the graphical user interface contemporaneously with the display of the first content.

9. The one or more non-transitory machine-readable storage media of claim 6, wherein the visual component corresponds with a region of the graphical user interface of the client device.

10. The one or more non-transitory machine-readable storage media of claim 6, wherein to determine the second content comprises to determine an advertiser-selected content based on a selection, by an advertiser, of content to correspond with the first content.

11. A method for facilitating browsing on a client device, the method comprising:

receiving, by a server and from the client device, a geographic location of the client device and an indicator that is representative of a network locator and is associated with a first content for display on a graphical user interface of the client device;

receiving, by the server and from a third-party advertiser, a specification of a priority of content selected by the third-party advertiser;

determining, by the server, a second content and a visual component representative of the second content based on the indicator, the geographic location, and the specification of the priority, wherein the visual component is selectable on the graphical user interface by a user of the client device to display the second content on the graphical user interface, wherein the second content is associated with a second network locator different from the first network locator and is less than an entirety of network content associated with the second network locator;

providing, by the server, the second content and the visual component to the client device contemporaneously; and notifying, by the server, the third-party advertiser of the user selection of the visual component on the client device in response to receipt of an indication of the selection from the client device.

12. The method of claim 11, wherein the second content comprises an advertisement.

13. The method of claim 11, wherein the visual component is selectable on the graphical user interface by the user of the client device to display the second content on the graphical user interface contemporaneously with the display of the first content.

14. The method of claim 11, wherein the visual component corresponds with a region of the graphical user interface of the client device.

15. The method of claim 11, wherein determining the second content comprises determining an advertiser-selected content based on a selection, by an advertiser, of content to correspond with the first content.

* * * * *